Aug. 12, 1941.   C. D. CLAWSON ET AL   2,252,166
VEHICLE LIFT
Filed July 24, 1939   3 Sheets-Sheet 1
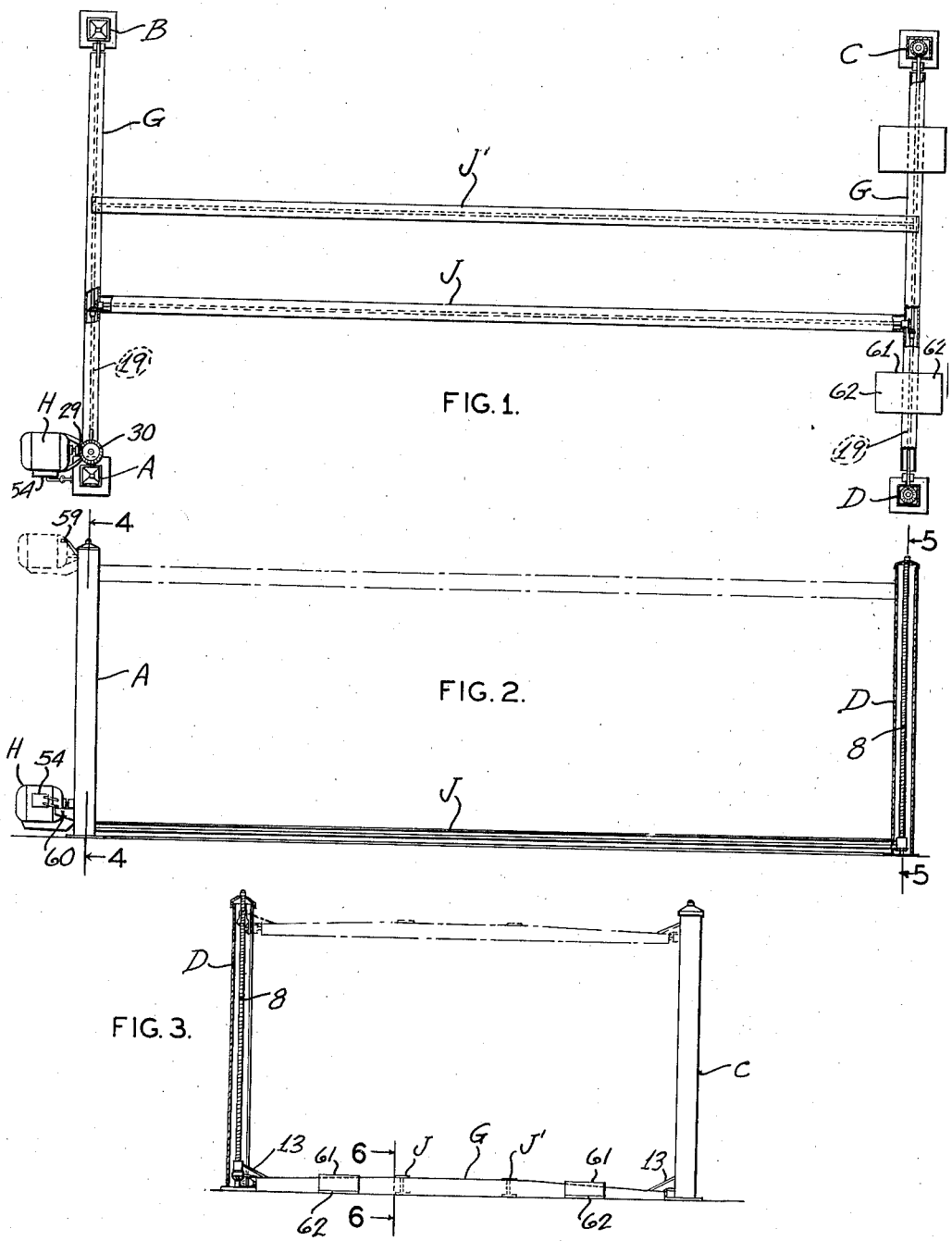
INVENTORS
CHESTER D. CLAWSON
THOMAS H. BRANCH
BY 
ATTORNEY.

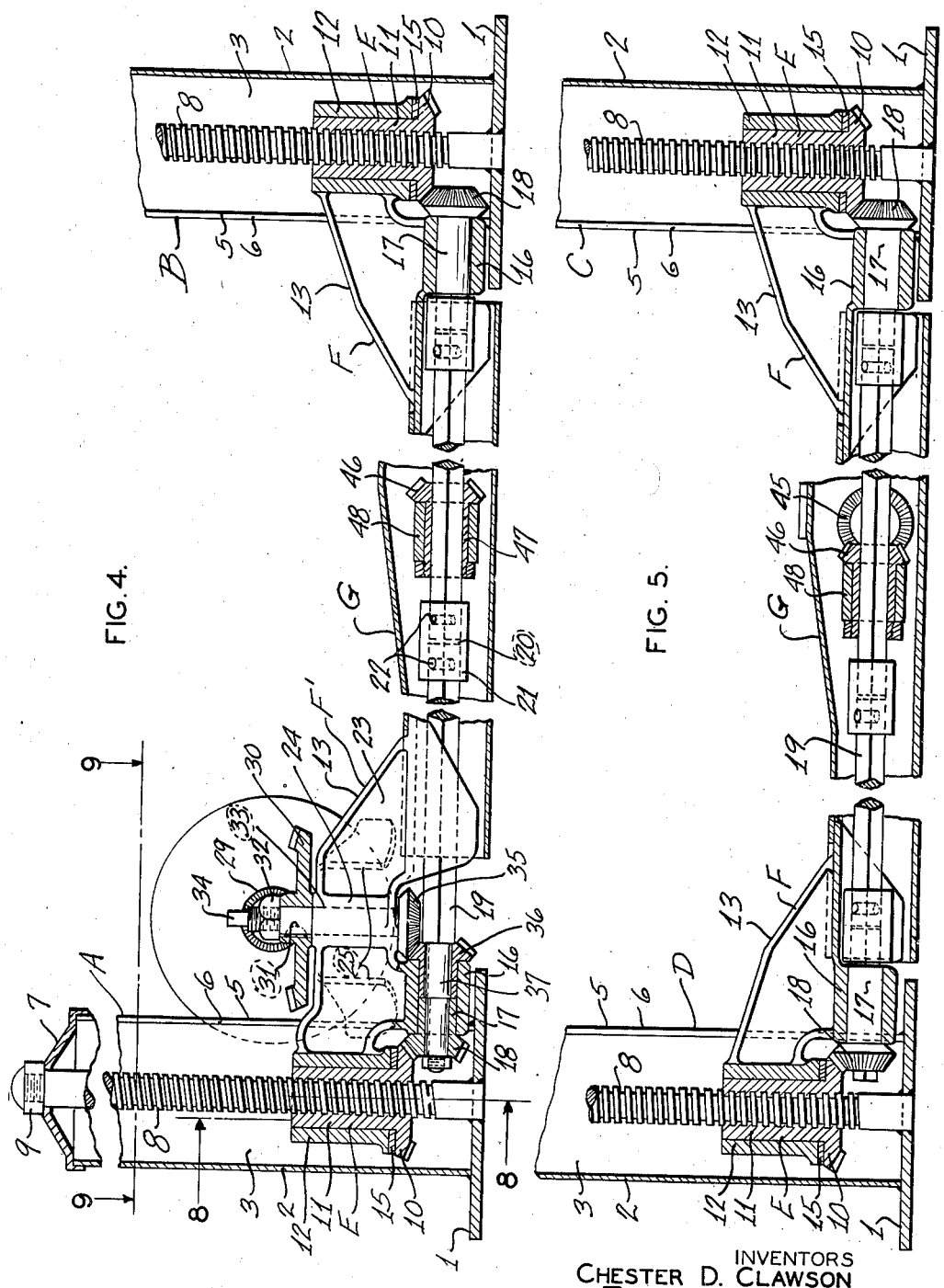

Aug. 12, 1941.  C. D. CLAWSON ET AL  2,252,166
VEHICLE LIFT
Filed July 24, 1939  3 Sheets-Sheet 3
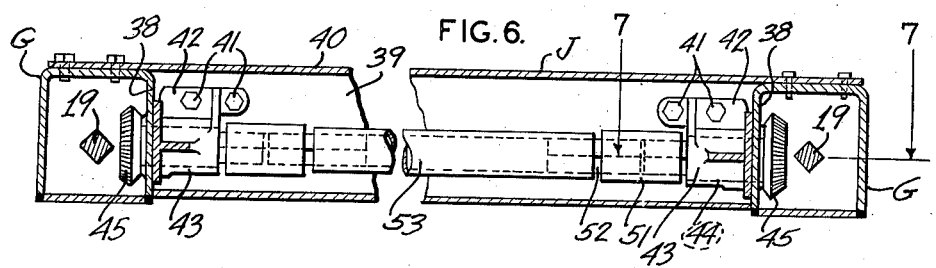
FIG. 6.
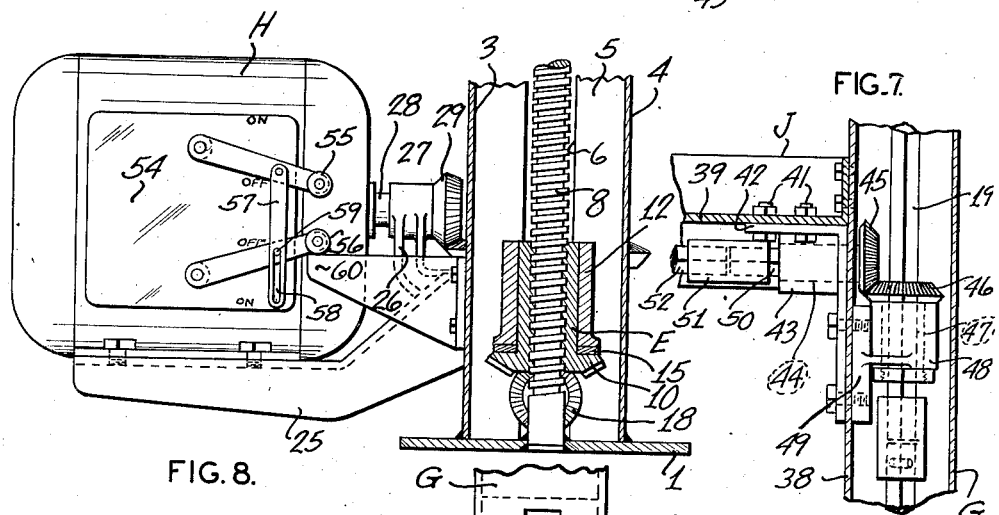
FIG. 7.
FIG. 8.
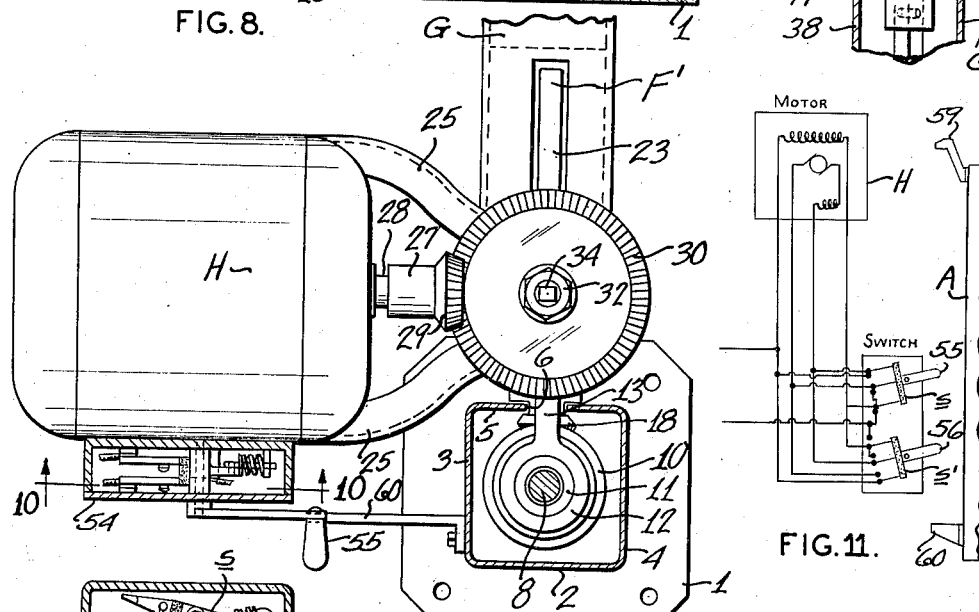
FIG. 11.
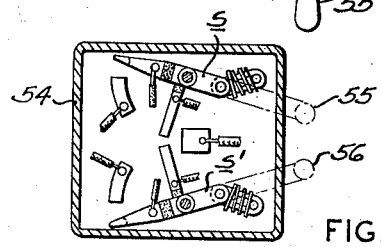
FIG. 10.
FIG. 9.
INVENTORS
CHESTER D. CLAWSON
THOMAS H. BRANCH
BY
ATTORNEY.

Patented Aug. 12, 1941

2,252,166

UNITED STATES PATENT OFFICE 2,252,166

VEHICLE LIFT

Chester D. Clawson, Pine Lawn, and Thomas H. Branch, St. Louis, Mo., assignors to St. Louis Lift & Equipment Corporation, St. Louis, Mo., a corporation of Missouri Application July 24, 1939, Serial No. 286,074

2 Claims. (Cl. 254—92)

This invention relates generally to vehicle lifts and, more particularly, to certain new and useful improvements in lifts especially, though not exclusively, adapted for use in connection with motor vehicles, such as passenger automobiles, trucks, buses, and the like for elevating the vehicles for facilitating lubrication, repair operations, and analogous purposes.

Our invention has for its primary objects the provision of a lift of the type and for the purposes stated which may be readily installed with the elimination of excavation or other costly preparatory operations, which is stable, positive, and safe in operation, which may be stopped at any level of elevation without danger of falling and is automatically controlled at the upper limit of its movement, which is economical in maintenance and operating costs, which is comparatively free of occupational hazard in that moving parts are largely concealed, protected, and guarded, and which is efficient in the performance of its intended functions.

And with the above and other objects in view, our invention resides in the novel features of form, construction, arrangement, and combination of parts presently described and pointed out in the claims.

In the accompanying drawings (3 sheets)—

Figure 1 is a plan view of a vehicle lift constructed in accordance with and embodying our present invention;

Figure 2 is a side elevational view, partly broken away and in section, of the lift;

Figure 3 is an end elevational view, partly broken away and in section, of the lift;

Figures 4 and 5 are enlarged detail sectional views of the lift, taken approximately along the lines 4—4 and 5—5, respectively, Figure 2;

Figure 6 is an enlarged detail sectional view of the lift, taken approximately along the line 6—6, Figure 3;

Figure 7 is an enlarged fragmentary sectional view of the lift, taken approximately along the line 7—7, Figure 6;

Figures 8 and 9 are enlarged fragmentary sectional views of the lift, taken approximately along the lines 8—8 and 9—9, respectively, Figure 4;

Figure 10 is a detail sectional view of the control box of our present invention, taken approximately along the line 10—10, Figure 9; and Figure 11 is a schematic wiring diagram of the control box and motor.

Referring now in more detail and by reference characters to the drawings, which illustrate a preferred embodiment of our present invention, the lift includes four upstanding parallel corner posts A, B, C, and D juxtaposed in the formation of a skeleton or open oblong-rectangular standard, each post being preferably constructed in the form of a hollow rectangular column having a preferably integrally formed flanged base 1 for floor attachment, an outer or front wall 2, opposite side walls 3 and 4, an inwardly presented so-called rear wall 5 provided lengthwise with a slot or way 6, and a centrally apertured top cap 7.

Welded or otherwise suitably fixed at its lower end in the base 1 and disposed axially or longitudinally within each respective post A, B, C, D, is a threaded shaft or stationary screw 8 projecting at its upper end through the aperture of, and securely, as by means of a cap-screw or the like 9, held under tension in, the cap 7.

Threadedly mounted for movement or travel on each of the screws 8, is a screw-nut E having a bevel-gear end-portion or ring 10 and a suitably elongated and diametrically reduced shank or bearing-portion 11, and loosely journaled or sleeved upon the shank 11 and supported upon the upper flat face of the bevel-gear ring 10, is a hub 12 joined preferably integrally by a suitable arm 13 presented outwardly through the adjacent shaft-way or slot 6 and integrally joined or otherwise forming part of a bracket or casting F or F' rigidly secured upon the end, or otherwise forming, in turn, part of a hollow or tubular cross-beam G of a so-called vehicle supporting and lifting frame. It will be understood that the arm 13 is of reduced width or thickness for facile travel in the slot 6 relatively to the particular post, and preferably interposed between the under face of the hub 12 and the upper face of the gear-ring 10, is a suitable preferably bronze bearing washer 15, all as best seen in Figures 4 and 5.

Each of the two cross-beams G of the lift is of a length to extend between the columns or posts at an end of the lift, as, for instance, between the posts A and B at one lift end and between the posts C and D at the opposite lift end, and forming preferably integral members, and disposed at the opposite ends of each beam G, are tubular journals 16 for rotatively supporting the hub 17 of bevel-gears 18 pinned or otherwise suitably fixed upon the opposite ends of suitable shafts 19 preferably of rectangular or other out-of-round section extending axially or longitudinally through the respective hollow beams G. As shown, the gears 18 operatively mesh with the respective gear-rings 10, and it may be here observed that, for convenience in assembly, the shafts 19 are preferably cut apart or split, as at 20, and suitably axially connected, as by means of coupling sleeves 21 and pins 22.

The particular bracket F' adjacent to and associated with one of the posts, as post A, includes an arm elongation or web-portion 23 and an intermediate vertically disposed tubular bearing or sleeve 24 spaced outwardly from the post A and also a pair of suitably elongated partially diverging and partially parallel outwardly projecting angular arms 25 providing a support or platform for, and to which is bolted or otherwise rigidly secured, a prime mover in the form preferably of an electric motor H. Also forming part of bracket F' and disposed in lateral alignment with the bearing or sleeve 24, are somewhat L-shaped auxiliary arms 26 supporting at their upper extremity a horizontally disposed bearing or sleeve 27, all as best seen in Figures 4 and 8, for rotarily supporting the motor shaft 28, fixed upon which is a bevel-gear 29 having meshing engagement with a relatively large horizontally disposed bevel-gear 30 secured, as by means of a key 31 and nut 32, upon the upper end of a short vertically disposed shaft 33 journaled in and extending through the bearing or sleeve 24 and provided on its upwardly projecting end with a squared end portion, as at 34, for purposes presently fully appearing. Fixed on the lower projecting end of the shaft 33, is a bevel-gear 35 having meshing engagement with an auxiliary bevel-gear 36 screwed or otherwise fixed upon the end of the square shaft 19 inwardly of the bevel-gear 17 and having an elongated hub 37 also journaled in the bearing sleeve 16, all as best seen in Figure 4.

Bolted or otherwise fixed at their opposite ends upon, and extending longitudinally of the lift between, the cross-beams G and also forming part of the vehicle lifting frame, is a pair of suitably laterally spaced parallel beams J, J', each preferably constructed of rolled steel I-beams having a vertically disposed web 39 and a horizontally disposed top flange 40 for supportingly engaging the under side of the vehicle axles, as presently more fully described.

Fixed, as by bolts or other conventional securing means 41, upon the web 39 of one of said lift-beams, as beam J, is a pair of outwardly presented brackets 42 having axially aligned bearing-sleeves 43 for rotatably accommodating tubular hub-members 44 projecting loosely through the respectively adjacent side walls 38 of the cross-beams G and provided preferably integrally with bevel-gears 45 having meshing engagement with auxiliary bevel-gears 46 similarly provided with suitably elongated hubs 47 drivingly mounted or fixed on the square shafts 19 and operatively journaled in bearing sleeves 48 formed preferably integrally with positioning brackets 49, in turn, conventionally bolted or otherwise fixed upon the inner face of a cross-beam side wall 38, all as best seen in Figures 6 and 7 and for purposes presently fully appearing.

Pinned or otherwise drivingly disposed within, and projecting outwardly from the tubular hubs 44 of the bevel gears 45, are square stub shafts 50 provided with opposed tubular connecting sleeves 51, in turn, provided with projecting auxiliary stub shafts 52 for endwise connection with a horizontally extending tubular drive shaft 53, all as best seen in Figure 6 and for purposes presently fully appearing.

Mounted upon the side face of the motor H, is a control box 54 comprising two triple-pole single-throw toggle switches s, s', having manually actuable operating handles 55, 56, respectively, and being connected to the shunt and starting windings of the motor H and any suitable source of electric power, substantially as shown in the wiring diagram, Figure 11, for starting, stopping, and reversing the motor H. The switch handle 55 is swingably provided with a vertical link 57 having a slot 58 for embracing disposition around a pin 59 fixed in the handle 56, so that either handle may be moved into "on" position when the other handle is in "off" position. On the other hand, it is impossible to move one handle into "on" position when the other handle is also in "on" position. The handles 55, 56, are further positioned respectively for striking abutment against stop projections 59, 60, suitably disposed on the adjacent post A for limiting the upward and downward travel of the cross-beams G.

Welded or otherwise secured upon the upper face of one of the cross-beams G and laterally of the lift spaced equidistantly outwardly from the lift beams J, J', is a pair of runway-plates 61 provided with opposed obliquely downwardly disposed flanges 62 for engagement along their outer transverse margins with the floor when the cross-beams G and the associated lift beams J, J', are in downwardly disposed position, so that the vehicle may be conveniently driven thereacross into position for elevation.

In use and operation, the vehicle to be elevated is driven over the run-way plates 61 to a position intermediate the cross-beams G in more or less central disposition over the lift beams J, J'. Thereupon the switch handle 55 is shifted, closing the circuit to the motor H. Upon energization, the rotary movement of the motor shaft 28 is drivingly transmitted through the bevel gears 29, 30, and 35 to the bevel gear 36 for actuating the connected shafts 19 of the particular adjacent beam G, the rotatory movement of which shafts is transmitted through the bevel gears 45 and the shaft 53 to the shafts 19 of the companion beam G. The rotatory movement of the several shafts 19 is, in turn, transmitted through the bevel gears 18 to the gear-rings 10 and the screw-nuts E threaded upwardly along the stationary screw-shafts 8, elevating the cross-beams G and the associated lift beams J, J'. As the top flanges 40 of the beams J, J', come into abutting engagement with the under sides of the vehicle axles, the vehicle is thereupon moved upwardly with the lift beams J, J', to any desired elevation, whereupon the switch handle 55 may be shifted to "off" position, breaking the circuit to the motor H and discontinuing further upward travel of the lift.

By reason of the fact that the stationary screws 8 are of so-called slow pitch, the cross-beams G and associated lift beams J, J', will remain in elevated position regardless of load and will not accidentally drop. If, through carelessness of the operator or some other accidental cause, the switch handle 55 is not shifted to "off" position and the cross-beams G approach the upper limits of the stationary screws 8, the switch handle 55 will come into engagement with the stop projection 59 of the post A, automatically shifting the handle 55 to "off" position and effecting cessation of upward travel of the lift before the gear nuts E actually reach the extreme upper end of the stationary screw-shafts 8.

To lower the lift and the supported vehicle, the switch handle 56 is shifted to "on" position, whereupon the motor H will be turned in the opposite direction and the entire mechanism will be reversed for lowering the lift beams J, J', and the supported vehicle to the ground. When the lift beams J, J', have been fully lowered, the switch handle 56 will come in contact with the stop projection 60 of the post A and be automatically shifted to "off" position for interrupting the circuit to the motor H. In the event of power failure or other mishap, the lift may be manually lowered by rotary manipulation of a conventional crank (not shown) operatively disposed upon the upper squared end 34 of the shaft 33.

The present lift is of the so-called "free wheeling" type and it should be understood that, while not here specifically shown, the lift may readily be converted to a lift of the so-called "drive on" type by mounting upon the longitudinal beams J, J', or other embodiment in the lift of trackways for the wheels of the automobile.

Thus, by our present invention, we provide a unique vehicle lift which fulfills in every respect the objects stated, and it should also be understood that changes and modifications in the form, construction, arrangement, and combination of the several parts of the lift may be made and substituted for those herein shown and described without departing from the nature and principle of our invention.

Having thus described our invention, what we claim and desire to secure by Letters Patent is:

1. A vehicle lift comprising, in combination, a standard including a plurality of spaced upstanding longitudinally slotted parallel posts, a vehicle support frame disposed for travel within the standard, stationary threaded shafts fixed and rigidly upstanding in the posts, screw-nuts disposed for movement on said shafts, each nut having an end ring and an elongated and diametrically reduced shank, brackets on the frame each having a hub rotatably fitted upon a particular nut-shank and resting for support on said end ring, and an arm disposed for movement in the particular post slot, a prime mover mounted on and movable with the frame, and driving connections between the prime mover and said nuts for actuating the latter for effecting travel of the frame relatively to the standard.

2. A vehicle lift including a set of elongated tubular posts each having a longitudinally slotted side face, a base member mounted at the lower end of each post, a cap mounted upon the other end of each post, a screw fixed at one end in each base and extending vertically within each post and through the cap thereof, fastening means upon the upper end of each post for tensioning the respective screws, a nut rotatably and translatively mounted on each screw, each nut having an elongated cylindrical shank and a downwardly presented bevel gear, and a bracket extending horizontally through each post-slot and having a hub journaled upon the shank of the nut within the post and supported upon the upper face of the bevel gear thereof.

CHESTER D. CLAWSON.
THOMAS H. BRANCH.